US011820377B2

(12) United States Patent
LaBarbera et al.

(10) Patent No.: US 11,820,377 B2
(45) Date of Patent: Nov. 21, 2023

(54) LONGITUDINAL CONTROL FEEDBACK COMPENSATION DURING BRAKE-TO-STEER

(71) Applicants: Steering Solutions IP Holding Corporation, Auburn Hills, MI (US); Continental Automotive Systems, Inc., Auburn Hills, MI (US)

(72) Inventors: Joseph A. LaBarbera, Auburn Hills, MI (US); Michael S. Wyciechowski, Grand Blanc, MI (US); Clinton L. Schumann, Holly, MI (US); Emmanuel Garcia, South Lyon, MI (US); Scott T. Sanford, Swartz Creek, MI (US); Gregory J. Katch, Fenton, MI (US)

(73) Assignees: Continental Automotive Systems, Inc., Auburn Hills, MI (US); Steering Solutions IP Holding Corporation, Auburn Hills, MI (US)

( * ) Notice: Subject to any disclaimer, the term of this patent is extended or adjusted under 35 U.S.C. 154(b) by 0 days.

(21) Appl. No.: 17/950,440

(22) Filed: Sep. 22, 2022

(65) Prior Publication Data

US 2023/0119249 A1 Apr. 20, 2023

Related U.S. Application Data

(60) Provisional application No. 63/257,048, filed on Oct. 18, 2021.

(51) Int. Cl.
*B60W 30/18* (2012.01)
*B60W 10/184* (2012.01)
(Continued)

(52) U.S. Cl.
CPC ...... *B60W 30/18145* (2013.01); *B60W 10/06* (2013.01); *B60W 10/08* (2013.01);
(Continued)

(58) Field of Classification Search
CPC ........... B60W 30/18145; B60W 10/06; B60W 10/08; B60W 10/11; B60W 10/184;
(Continued)

(56) References Cited

U.S. PATENT DOCUMENTS

2009/0043474 A1* 2/2009 Nakai ................. B60W 30/143 701/70
2010/0076650 A1* 3/2010 Spadafora ............. B62D 5/003 701/43
(Continued)

*Primary Examiner* — Huan Le
*Assistant Examiner* — Aimee Tran Nguyen
(74) *Attorney, Agent, or Firm* — Lorenz & Kopf LLP

(57) ABSTRACT

A number of illustrative variations may include a system including brake-to-steer algorithms may achieve lateral control of a vehicle without longitudinal compensation but may also force a vehicle to slow down too rapidly before appropriate lateral movement can be achieved and may deliver an unnatural driving experience for vehicle occupants. A more natural feeling deceleration may be achieved by optimally selecting appropriate transmission shifts to allow for optimal engine speed or electric motor speed and torque based on current vehicle speed thereby reducing undesirably longitudinal disturbance.

23 Claims, 1 Drawing Sheet

104 106 108 102 114 112 116 120 138 122 124 126 130 110 128 118 132 134 136 140 142 144 148

(51) Int. Cl.
*B60W 10/08* (2006.01)
*B60W 10/11* (2012.01)
*B60W 10/06* (2006.01)

(52) U.S. Cl.
CPC .......... *B60W 10/11* (2013.01); *B60W 10/184* (2013.01); *B60W 2520/105* (2013.01); *B60W 2710/0644* (2013.01); *B60W 2710/0666* (2013.01); *B60W 2710/081* (2013.01); *B60W 2710/083* (2013.01); *B60W 2710/105* (2013.01); *B60W 2710/1038* (2013.01); *B60W 2710/18* (2013.01)

(58) Field of Classification Search
CPC ... B60W 2520/105; B60W 2710/0644; B60W 2710/0666; B60W 2710/081; B60W 2710/083; B60W 2710/1038; B60W 2710/105; B60W 2710/18
See application file for complete search history.

(56) References Cited

U.S. PATENT DOCUMENTS

2010/0332096 A1* 12/2010 Hanzawa ............. B60K 31/047 701/70
2017/0015321 A1* 1/2017 Nakadori ............... B60W 10/11

* cited by examiner

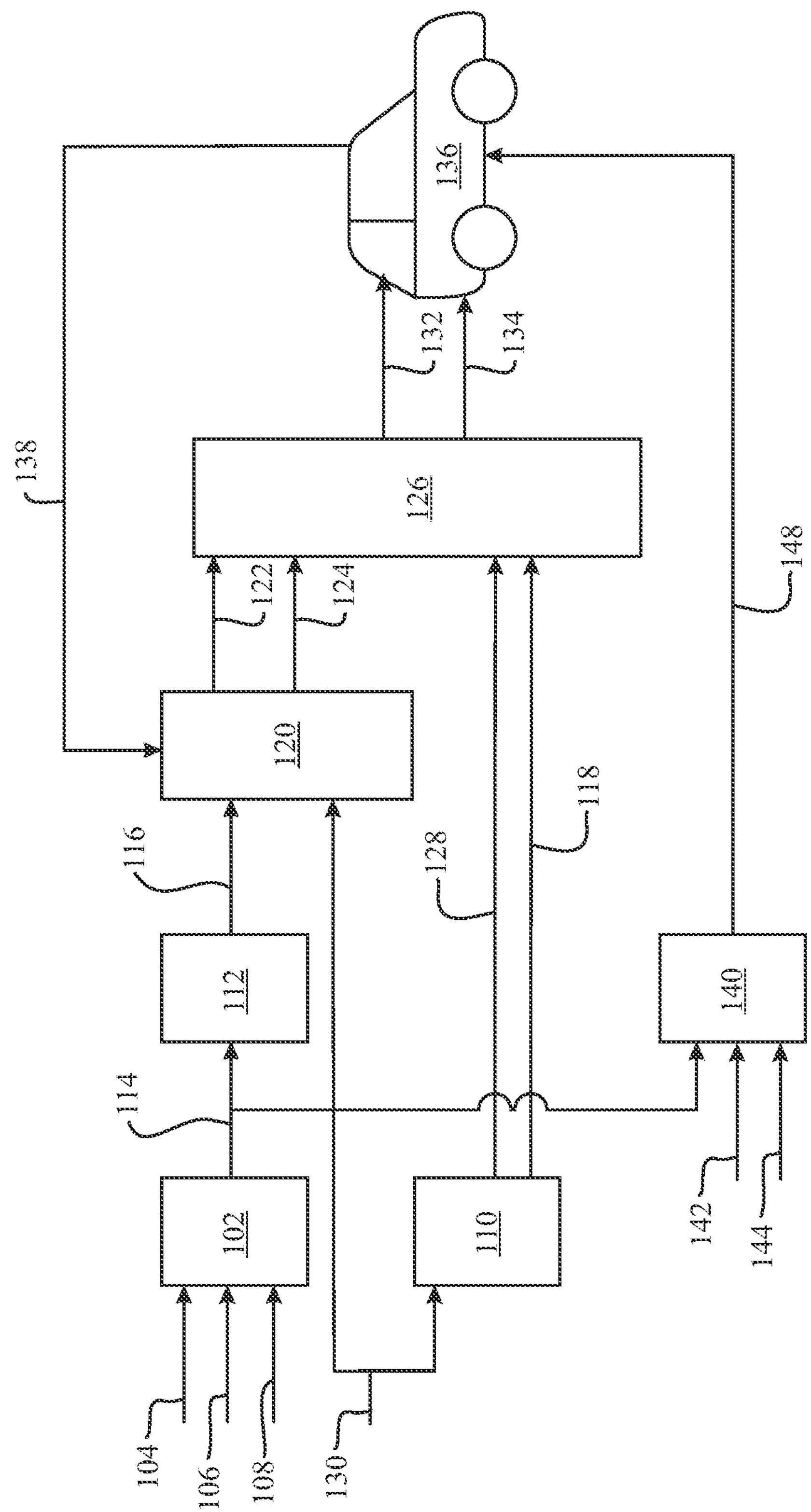
136
132
134
138
126
122
124
148
120
116
128
118
112
140
114
102
110
142
144
104
106
108
130

LONGITUDINAL CONTROL FEEDBACK COMPENSATION DURING BRAKE-TO-STEER

CROSS REFERENCE TO RELATED APPLICATIONS

This application claims the benefit of the filing date of U.S. Provisional Application Ser. No. 63/257,048, filed Oct. 18, 2021.

TECHNICAL FIELD

The field to which the disclosure generally relates to includes steering, braking, and propulsion systems.

BACKGROUND

Vehicles may include steering systems including electronic power steering systems incorporating steer-by-wire technology or brake-to-steer technology. A vehicle with a functioning steering system may maintain a constant velocity when a steering input is applied. In a brake-to-steer scenario, applying the brakes to steer a vehicle may cause the vehicle to slow down. Simultaneously, driver input may require deceleration or other changes to vehicle speed or acceleration. During driver brake input and brake-to-steer input, optimal axle torque control may be achieved by selecting appropriate transmission gears.

SUMMARY OF ILLUSTRATIVE VARIATIONS

During steering failures, braking on individual wheels with varying torques can be used to laterally steer a vehicle via brake-to-steer. In a brake-to-steer scenario, applying the brakes to steer a vehicle causes the unwanted, rapid deceleration in a vehicle. A more natural deceleration feel, such as when a vehicle is coasting and decelerates due to natural forces, may be achieved by selecting appropriate transmission gears or shift the equivalent of gear ration to allow for optimal engine speed or electric motor speed and torque based on current vehicle speed.

A number of illustrative variations may include a system including brake-to-steer systems that may achieve lateral control of a vehicle without longitudinal compensation. Brake-to-steer functionality may force a vehicle to slow down too rapidly, unevenly, or uncomfortably before appropriate lateral movement can be achieved. Brake-to-steer functionality may deliver an unnatural driving experience for vehicle occupants. A more natural feeling deceleration during brake-to-steer may be achieved by executing closed loop longitudinal control of a vehicle while optimally selecting appropriate transmission gears or the equivalent shift of gear ratio to allow for optimal engine speed or electric motor speed and torque based on current vehicle speed to assist with longitudinal control and thereby reducing undesirable longitudinal disturbance.

A number of variation may include A non-transitory computer readable medium having instructions there on executable by an electronic processor to implement functionality comprising: receiving vehicle speed data, accelerator controller position data, and powertrain state data in a driver intent calculation module; generating desired vehicle speed requests via the driver intent calculation module; communicating desired vehicle speed requests to a longitudinal kinematic motion controller and to a transmission shift request module; generating desired longitudinal acceleration requests via the longitudinal kinematic motion controller; communicating desired longitudinal acceleration requests to a longitudinal dynamic motion controller; receiving steering fault status via the longitudinal dynamic motion controller; receiving steering fault status via a brake-to-steer system, the brake-to-steer system being constructed and arranged to generate at least one brake torque command and at least one feed-forward propulsion torque command; communicating the at least one brake torque command and the at least one feed-forward propulsion torque command to a final longitudinal command processing module; generating at least one propulsion torque request or at least one brake torque request; communicating propulsion torque requests and brake torque requests to the final longitudinal command processing module; generating at least one final propulsion torque request and at least one final brake torque request; communicating the at least one final propulsion torque request and at least one final brake torque request to at least one vehicle system; measuring longitudinal acceleration of the vehicle; communicating measured longitudinal acceleration to the longitudinal dynamic motion controller; modifying the at least one propulsion torque request or at least one brake torque request based on measured longitudinal acceleration of the vehicle to form a closed-loop control system of propulsion torque requests and brake torque requests; codifying receiving engine speed data or electric motor speed and wheel speeds data via the transmission gear or shift request module; generating a transmission gear or shift request; and communicating the transmission gear or shift request to the at least one vehicle system.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts an illustrative variation of a simplified diagram including a system and method for longitudinal control feedback compensation during brake-to-steer.

DETAILED DESCRIPTION OF ILLUSTRATIVE VARIATIONS

The following description of the variations is merely illustrative in nature and is in no way intended to limit the scope of the invention, its application, or uses.

In a number of illustrative variations, a vehicle may comprise a steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time. In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of the steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers, and electronically excited actuators. According to some variations, a steer-by-wire system may include at least one road wheel actuator and at least one a handwheel actuator in operable communication with one another via a steer-by-wire system or controller. The steer-by-wire system may include a road wheel actuator system in operable communication with a hand wheel actuator system wherein rotation of the steering wheel or handwheel of a vehicle translates to actuation of the road wheel actuator system such that a vehicle wheel may be turned.

The handwheel actuator assembly may include a steering wheel, a handwheel actuator, such as an electronic motor, and a hand wheel angle sensor. The handwheel actuator assembly may be constructed and arranged communicate handwheel angle and position to the road wheel actuator assembly including at least one steering actuator constructed and arranged to pivot or turn a road wheel.

In a number of illustrative variations, a vehicle may include electronic braking system constructed and arranged to apply brake torque to any number of road wheels to slow or stop a vehicle based upon driver handwheel input. The electronic braking system may be in operable communication with the steer-by-wire system, hand wheel actuator assembly, and road wheel actuator assembly via at least one controller. The controller, such as a computing device, may implement any number of systems, including algorithms, for monitoring and controlling propulsion, steering, and braking. According to some variations, the electronic braking system may be utilized to apply differential brake torque to a number of wheels to effectuate lateral motion of the vehicle where a portion of a steer-by-wire system has failed, such as an operable disconnect between the wheel actuator assembly and the roadwheel actuator assembly.

In a number of illustrative variations, an electronic braking system may utilize a brake-to-steer system including a brake-to-steer algorithm that may communicate brake torque requests to individual wheels as a function of driver steering inputs including steering angle, steering angle rate, and steering torque to steer a vehicle. The brake-to-steer algorithm may communicate brake torque requests when the system has detected a road wheel actuator failure or shut down leading to no output capable of a steering rack. Alternatively, the brake-to-steer algorithm may communicate brake torque requests when the system has detected hand wheel actuator failure or shut down.

In a number of illustrative variations, an electronic braking system may be in operable communication with a mechanical brake system that may include components such as, but not limited to, brake calipers, brake rotors, linings, and the like. During certain circumstances, electronic braking systems in combination with mechanical brake systems may be used to increase vehicle safety such as during electronic stability control events. As used herein, “brake torque,” “brake force,” or “brake torque” and variations on those terms may refer broadly to the power or ability of any braking system to slow a vehicle Brake-to-steer functionality including brake-to-steer algorithms may achieve lateral control of a vehicle without longitudinal compensation but may also force a vehicle to slow down too rapidly before appropriate lateral movement can be achieved.

According to some variations, an electronic braking system in combination with a brake-to-steer system may communicate a target deceleration to a longitudinal dynamic control system including a longitudinal dynamic control algorithm. The longitudinal dynamic control algorithm may regulate throttle and brake torque to achieve target deceleration in the vehicle while monitoring measured longitudinal deceleration feedback. The system may monitor measured vehicle speed and communicate commands to an electronic transmission control module and change transmission gear or shift the equivalent of gear ratio as needed in order to maintain desired engine speed or electric motor speed and optimal engine or motor torque in order to overcome rapid deceleration associated with brake-to-steer functionality.

Driver acceleration and deceleration controller inputs, such as via an accelerated pedal, joystick slider, rotatable knob, hand control or brake pedal, joystick slider, rotatable knob, hand control may be accounted for by adjusting target speed or acceleration within the longitudinal dynamic control algorithm. A longitudinal dynamic control feedback control mechanism by providing instantaneous feedforward powertrain torque requests to assist with longitudinal disturbance associated with brake-to-steer functionality.

As a non-limiting example, a driver or autonomous driving system may be driving a vehicle utilizing a steer by wire or similar steering systems. The steering system may fail, and brake-to-steer functionality may be activated via at least one controller. A feedforward compensation system may provide powertrain torque requests to minimize deceleration of the vehicle during brake-to-steer. A longitudinal dynamic control system may measure longitudinal acceleration and provide powertrain torque requests to maintain a prescribed vehicle deceleration target. The longitudinal dynamic control system may additionally monitor engine or motor revolutions per minute and provide transmission gear or shift requests to maintain desired engine or motor revolutions per minute such that engine or motor torque is maintained at an optimal target value. In the case of additional driver brake input, primary and secondary longitudinal control functions may adjust powertrain torque requests, deceleration target, desired engine or motor revolutions per minute, and transmission gear or shift requests accordingly. In this way, the vehicle may perform brake-to-steer lateral maneuvers while maintaining vehicle speed, acceleration, or deceleration in an intuitive manner and mimic the feel of a natural driving experience.

A system for longitudinal control feedback compensation in a vehicle may be implemented on any number of controllers within a vehicle environment such as, but not limited to, a controller managing the brake-to-steer function, a domain controller, or actuator controller including braking electronic control units and steering handwheel actuators during steer-by-wire operation or road wheel actuator failure. A system for longitudinal control feedback compensation in a vehicle may be implemented on various other controllers including, but not limited to, powertrain control modules, transmission control units, or body control modules. The system may be used with a transmission having mechanical gears, a continuous variable transmission, an e-transmission or other propulsion devices capable of performing the equivalent of shifting gears.

FIG. 1 is simply illustrative. The functionality of various systems or algorithms may be carried out by one or more controllers situated anywhere in a vehicle. The block diagram presented in FIG. 1 is one depiction of a logical architecture that may reside in any number of controllers. One or more algorithms may be used and executed by one or more electronic processors to accomplish the methods, actions, and functionality described herein. Each system, controller, and variation described herein may include a non-transitory computer readable medium having instructions thereon executable by an electronic processor to implement functionality, methods, acts, steps, and actions described herein.

FIG. 1 depicts an illustrative variation of block diagram of a system and method managing longitudinal disturbance in a vehicle during brake-to-steer that may include a longitudinal dynamic motion controller 120 constructed and arranged to communicate propulsion torque requests 122 and brake torque requests 124 to a final longitudinal command processing module 126. A brake-to-steer system 110 may receive steering fault status 130 from an electronic power steering system and communicate brake torque commands 128 and feed-forward, open loop, or immediate propulsion torque commands 118 to the final longitudinal command processing module 126. The longitudinal dynamic motion controller 120 may also receive steering fault status 130 from an electronic power steering system. The longitudinal dynamic motion controller 120 may additionally receive desired longitudinal acceleration requests 116 from a longitudinal kinematic motion controller 112. The longitudinal kinematic motion controller 112 may receive desired vehicle speed requests 114 from a driver intent calculation module 102. The driver intent calculation module 102 may receive vehicle data such as, but not limited to, vehicle speed 104, accelerator controller position data 106, and powertrain state data 108. In this way, vehicle speed data 104, accelerator controller position data 106, and powertrain state data 108, may be combined with steering fault status 130 to generate propulsion torque requests 122 and brake torque requests 124 which may be communicated to the final longitudinal command processing module 126.

The final longitudinal command processing module 126 may utilize propulsion torque requests 122, brake torque requests 124, brake torque commands 128, and feed forward, open loop, or immediate propulsion torque commands 118 to generate final propulsion torque requests 132 and final brake torque requests 134 which may be communicated to appropriate vehicle systems 136 such as, but not limited to, propulsion, steering, braking, or transmission systems, control units, controllers, or electronic control units associated with propulsion, steering, braking, or transmission systems. The final longitudinal command processing module 126 may generate final propulsion torque requests 132 and final brake torque requests 134 via consolidating propulsion torque requests 122, brake torque requests 124, brake torque commands 128, and feed forward, open loop, or immediate propulsion torque commands 118. Vehicle systems 136 may communicate measured longitudinal acceleration 138 to the longitudinal dynamic motion controller 120 as part of a closed-loop control system. The longitudinal dynamic motion controller 120 may calculate the difference between target acceleration 116 and measured acceleration 138 within a vehicle to generate, in conjunction with the final longitudinal command processing module 126, final propulsion torque requests 132 and final brake torque requests 134. The transmission gear request module 140 may receive desired vehicle speed data 114, engine speed or electric motor speed 142, and wheel speeds 144 and calculate transmission gear requests 148 communicated to vehicle systems 136 to facilitate transmission gear changes or propulsion shifts within a vehicle to maintain a target engine speed or electric motor speed and engine or motor torque thereby reducing undesirable longitudinal disturbance within a vehicle.

According to some variations, driver input such as acceleration or deceleration inputs, may be accounted for by adjusting desired vehicle speed 114 or target longitudinal acceleration 116.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a method for use in a vehicle may include receiving vehicle speed data, accelerator controller position data, and powertrain state data in a driver intent calculation module; generating desired vehicle speed requests via the driver intent calculation module; communicating desired vehicle speed requests to a longitudinal kinematic motion controller and to a transmission gear request module; generating desired longitudinal acceleration requests via the longitudinal kinematic motion controller; communicating desired longitudinal acceleration requests to a longitudinal dynamic motion controller; receiving steering fault status via the longitudinal dynamic motion controller; receiving steering fault status via a brake-to-steer system, the brake-to-steer system being constructed and arranged to generate at least one brake torque command and at least one feed-forward propulsion torque command; communicating the at least one brake torque command and the at least one feed-forward propulsion torque command to a final longitudinal command processing module; generating at least one propulsion torque request or at least one brake torque request; communicating propulsion torque requests and brake torque requests to the final longitudinal command processing module; generating at least one final propulsion torque request and at least one final brake torque request; communicating the at least one final propulsion torque request and at least one final brake torque request to at least one vehicle system; measuring longitudinal acceleration of the vehicle; communicating measured longitudinal acceleration to the longitudinal dynamic motion controller; modifying the at least one propulsion torque request or at least one brake torque request based on measured longitudinal acceleration of the vehicle to form a closed-loop control system of propulsion torque requests and brake torque requests; receiving engine speed or electric motor speed data and wheel speeds data via the transmission gear or shift request module; generating a transmission gear or shift request; and communicating the transmission gear request to the at least one vehicle system.

Variation 2 may include a method for use in a vehicle as in variation 1, wherein the at least one vehicle system is a transmission control unit.

Variation 3 may include a method for use in a vehicle as in any of variations 1 through 2, further including changing a transmission gear within the vehicle to maintain a target engine speed or electric motor speed and engine or motor torque.

Variation 4 may include a method for use in a vehicle as in any of variations 1 through 3, wherein changing a transmission gear facilitates reducing undesirable longitudinal disturbance within a vehicle.

Variation 5 may include a method for use in a vehicle as in any of variations 1 through 4, wherein generating at least one final propulsion torque request and at least one final brake torque request includes consolidating propulsion torque requests, brake torque requests, brake torque commands, and feed forward propulsion torque commands.

Variation 6 may include a method for use in a vehicle as in any of variations 1 through 5, wherein communicating the at least one final propulsion torque request and at least one final brake torque request to at least one vehicle system includes communicating the at least one final propulsion torque request to a propulsion system; and communicating the at least one final brake torque request to a braking system.

Variation 7 may include a method for use in a vehicle as in any of variations 1 through 6, further including generating a target engine speed or electric motor speed and a target engine or motor torque prior to generating at least one final propulsion torque request and at least one final brake torque request.

Variation 8 may include a method for use in a vehicle as in any of variations 1 through 7, wherein the at least one vehicle system is a transmission control unit.

Variation 9 may include a method for use in a vehicle as in any of variations 1 through 8, further including changing a transmission gear within the vehicle to maintain a target engine speed or electric motor speed and engine or motor torque.

Variation 10 may include a method for use in a vehicle as in any of variations 1 through 9, wherein changing a transmission gear within the vehicle to maintain a target engine speed or electric motor speed and engine or motor torque occurs during a brake-to-steer event.

According to variation 11, a method for use in a vehicle may include receiving vehicle speed data, accelerator controller position data, and powertrain state data in a driver intent calculation module; generating desired vehicle speed requests via the driver intent calculation module; communicating desired vehicle speed requests to a longitudinal kinematic motion controller and to a transmission shift request module; generating desired longitudinal acceleration requests via the longitudinal kinematic motion controller; communicating desired longitudinal acceleration requests to a longitudinal dynamic motion controller; receiving steering fault status via the longitudinal dynamic motion controller; receiving steering fault status via a brake-to-steer system, the brake-to-steer system being constructed and arranged to generate at least one brake torque command and at least one feed-forward propulsion torque command; communicating the at least one brake torque command and the at least one feed-forward propulsion torque command to a final longitudinal command processing module; generating at least one propulsion torque request or at least one brake torque request; communicating propulsion torque requests and brake torque requests to the final longitudinal command processing module; generating a target engine speed or electric motor speed and a target engine motor torque; generating at least one final propulsion torque request and at least one final brake torque request; communicating the at least one final propulsion torque request and at least one final brake torque request to at least one first vehicle system; measuring longitudinal acceleration of the vehicle; communicating measured longitudinal acceleration to the longitudinal dynamic motion controller; modifying the at least one propulsion torque request or at least one brake torque request based on measured longitudinal acceleration of the vehicle to form a closed-loop control system of propulsion torque requests and brake torque requests; receiving engine speed data or electric motor speed and wheel speeds data via the transmission shift request module; generating a transmission shift request; communicating the transmission shift request to at least one second vehicle system; and changing a transmission shift within the vehicle to maintain a target engine speed or electric motor speed and engine or motor torque during a brake-to-steer event.

Variation 12 may include a method for use in a vehicle as in variation 11, wherein the at least one second vehicle system is a transmission control unit.

Variation 13 may include a method for use in a vehicle as in any of variations 11 through 12, wherein generating a target engine speed or electric motor speed and a target engine or motor torque is dependent on measured vehicle speed.

Variation 14 may include a non-transitory computer readable medium having instructions thereon executable by an electronic processor to implement functionality comprising: receiving vehicle speed data, accelerator controller position data, and powertrain state data in a driver intent calculation module; generating desired vehicle speed requests via the driver intent calculation module; communicating desired vehicle speed requests to a longitudinal kinematic motion controller and to a transmission gear request module; generating desired longitudinal acceleration requests via the longitudinal kinematic motion controller; communicating desired longitudinal acceleration requests to a longitudinal dynamic motion controller; receiving steering fault status via the longitudinal dynamic motion controller; receiving steering fault status via a brake-to-steer system, the brake-to-steer system being constructed and arranged to generate at least one brake torque command and at least one feed-forward propulsion torque command; communicating the at least one brake torque command and the at least one feed-forward propulsion torque command to a final longitudinal command processing module; generating at least one propulsion torque request or at least one brake torque request; communicating propulsion torque requests and brake torque requests to the final longitudinal command processing module; generating at least one final propulsion torque request and at least one final brake torque request; communicating the at least one final propulsion torque request and at least one final brake torque request to at least one vehicle system; measuring longitudinal acceleration of the vehicle; communicating measured longitudinal acceleration to the longitudinal dynamic motion controller; modifying the at least one propulsion torque request or at least one brake torque request based on measured longitudinal acceleration of the vehicle to form a closed-loop control system of propulsion torque requests and brake torque requests; receiving engine speed or electric motor speed data and wheel speeds data via the transmission gear or shift request module; generating a transmission gear or shift request; and communicating the transmission gear request to the at least one vehicle system.

Variation 15 may include a non-transitory computer readable medium as in variation 14, wherein the at least one vehicle system is a transmission control unit.

Variation 16 may include a non-transitory computer readable medium as in any of variations 14 through 15, further including changing a transmission gear within the vehicle to maintain a target engine speed or electric motor speed and engine or motor torque.

Variation 17 may include a non-transitory computer readable medium as in any of variations 14 through 16, wherein changing a transmission gear facilitates reducing undesirable longitudinal disturbance within a vehicle.

Variation 18 may include a non-transitory computer readable medium as in any of variations 14 through 17, wherein generating at least one final propulsion torque request and at least one final brake torque request includes consolidating propulsion torque requests, brake torque requests, brake torque commands, and feed forward propulsion torque commands.

Variation 19 may include a non-transitory computer readable medium as in any of variations 14 through 18, wherein communicating the at least one final propulsion torque request and at least one final brake torque request to at least one vehicle system includes communicating the at least one final propulsion torque request to a propulsion system; and communicating the at least one final brake torque request to a braking system.

Variation 20 may include a non-transitory computer readable medium as in any of variations 14 through 19, further including generating a target engine speed or electric motor speed and a target engine or motor torque prior to generating at least one final propulsion torque request and at least one final brake torque request.

Variation 21 may include a non-transitory computer readable medium as in any of variations 14 through 20, wherein the at least one vehicle system is a transmission control unit.

Variation 22 may include a non-transitory computer readable medium as in any of variations 14 through 21, further including changing a transmission gear within the vehicle to maintain a target engine speed or electric motor speed and engine or motor torque.

Variation 23 may include a non-transitory computer readable medium as in any of variations 14 through 22, wherein changing a transmission gear within the vehicle to maintain a target engine speed or electric motor speed and engine or motor torque occurs during a brake-to-steer event.

The above description of select variations within the scope of the invention is merely illustrative in nature and, thus, variations or variants thereof are not to be regarded as a departure from the spirit and scope of the invention.

What is claimed is:

1. A method for use in a vehicle comprising:

receiving vehicle speed data, accelerator controller position data, and powertrain state data in a driver intent calculation module;

generating desired vehicle speed requests via the driver intent calculation module;

communicating the desired vehicle speed requests to a longitudinal kinematic motion controller and to a transmission shift request module;

generating desired longitudinal acceleration requests via the longitudinal kinematic motion controller;

communicating the desired longitudinal acceleration requests to a longitudinal dynamic motion controller;

receiving steering fault status via the longitudinal dynamic motion controller;

receiving the steering fault status via a brake-to-steer system, the brake-to-steer system being constructed and arranged to generate at least one brake torque command and at least one feed-forward propulsion torque command;

communicating the at least one brake torque command and the at least one feed-forward propulsion torque command to a final longitudinal command processing module;

generating at least one propulsion torque request or at least one brake torque request;

communicating propulsion torque requests and brake torque requests to the final longitudinal command processing module;

generating at least one final propulsion torque request and at least one final brake torque request;

communicating the at least one final propulsion torque request and at least one final brake torque request to at least one vehicle system;

measuring longitudinal acceleration of the vehicle;

communicating the measured longitudinal acceleration to the longitudinal dynamic motion controller;

modifying the at least one propulsion torque request or at least one brake torque request based on the measured longitudinal acceleration of the vehicle to form a closed-loop control system of propulsion torque requests and brake torque requests;

receiving engine speed data or electric motor speed and wheel speeds data via the transmission gear or shift request module;

generating a transmission gear or shift request; and communicating the transmission gear or shift request to the at least one vehicle system.

2. The method for use in a vehicle the in claim 1, wherein the at least one vehicle system is a transmission control unit.

3. The method for use in a vehicle the in claim 2, further comprising changing a transmission shift within the vehicle to maintain a target engine speed or electric motor speed and engine or motor torque.

4. The method for use in a vehicle the in claim 3, wherein changing the transmission shift facilitates reducing undesirable longitudinal disturbance within the vehicle.

5. The method for use in the vehicle as in claim 1, wherein generating the at least one final propulsion torque request and the at least one final brake torque request comprises consolidating propulsion torque requests, brake torque requests, brake torque commands, and feed forward propulsion torque commands.

6. The method for use in the vehicle as in claim 1, wherein communicating the at least one final propulsion torque request and at least one final brake torque request to at least one vehicle system comprises:

communicating the at least one final propulsion torque request to a propulsion system; and communicating the at least one final brake torque request to a braking system.

7. The method for use in the vehicle as in claim 1, further comprising generating a target engine speed or electric motor speed and a target engine or motor torque prior to generating the at least one final propulsion torque request and the at least one final brake torque request.

8. The method for use in the vehicle as in claim 7, wherein the at least one vehicle system is a transmission control unit.

9. The method for use in the vehicle as in claim 8, further comprising changing a transmission shift within the vehicle to maintain a target engine speed or electric motor speed and engine or motor torque.

10. The method for use in the vehicle as in claim 9, wherein changing the transmission shift within the vehicle to maintain a target engine speed or electric motor speed and engine or motor torque occurs during a brake-to-steer event.

11. A method for use in a vehicle comprising:

receiving vehicle speed data, accelerator controller position data, and powertrain state data in a driver intent calculation module;

generating desired vehicle speed requests via the driver intent calculation module;

communicating the desired vehicle speed requests to a longitudinal kinematic motion controller and to a transmission shift request module;

generating desired longitudinal acceleration requests via the longitudinal kinematic motion controller;

communicating the desired longitudinal acceleration requests to a longitudinal dynamic motion controller;

receiving steering fault status via the longitudinal dynamic motion controller;

receiving the steering fault status via a brake-to-steer system, the brake-to-steer system being constructed and arranged to generate at least one brake torque command and at least one feed-forward propulsion torque command;

communicating the at least one brake torque command and the at least one feed-forward propulsion torque command to a final longitudinal command processing module;

generating at least one propulsion torque request or at least one brake torque request;

communicating propulsion torque requests and brake torque requests to the final longitudinal command processing module;

generating a target engine speed or electric motor speed and a target engine or motor torque;

generating at least one final propulsion torque request and at least one final brake torque request;

communicating the at least one final propulsion torque request and at least one final brake torque request to at least one first vehicle system;

measuring longitudinal acceleration of the vehicle;

communicating the measured longitudinal acceleration to the longitudinal dynamic motion controller;

modifying the at least one propulsion torque request or at least one brake torque request based on the measured longitudinal acceleration of the vehicle to form a closed-loop control system of propulsion torque requests and brake torque requests;

receiving engine speed or motor speed data and wheel speeds data via the transmission gear or shift request module;

generating a transmission gear or shift request;

communicating the transmission gear or shift request to at least one second vehicle system; and changing a transmission gear or shift within the vehicle to maintain a target engine speed or electric motor speed and engine or motor torque during a brake-to-steer event.

12. The method for use in the vehicle as in claim 11, wherein the at least one second vehicle system is a transmission control unit.

13. The method for use in the vehicle as in claim 11, wherein generating the target engine speed or electric motor speed and a target engine or motor torque is dependent on measured vehicle speed.

14. A non-transitory computer readable medium having instructions there on executable by an electronic processor to implement functionality comprising:

receiving vehicle speed data, accelerator controller position data, and powertrain state data in a driver intent calculation module;

generating desired vehicle speed requests via the driver intent calculation module;

communicating the desired vehicle speed requests to a longitudinal kinematic motion controller and to a transmission shift request module;

generating desired longitudinal acceleration requests via the longitudinal kinematic motion controller;

communicating the desired longitudinal acceleration requests to a longitudinal dynamic motion controller;

receiving steering fault status via the longitudinal dynamic motion controller;

receiving the steering fault status via a brake-to-steer system, the brake-to-steer system being constructed and arranged to generate at least one brake torque command and at least one feed-forward propulsion torque command;

communicating the at least one brake torque command and the at least one feed-forward propulsion torque command to a final longitudinal command processing module;

generating at least one propulsion torque request or at least one brake torque request;

communicating propulsion torque requests and brake torque requests to the final longitudinal command processing module;

generating at least one final propulsion torque request and at least one final brake torque request;

communicating the at least one final propulsion torque request and at least one final brake torque request to at least one vehicle system;

measuring longitudinal acceleration of the vehicle;

communicating the measured longitudinal acceleration to the longitudinal dynamic motion controller;

modifying the at least one propulsion torque request or at least one brake torque request based on the measured longitudinal acceleration of the vehicle to form a closed-loop control system of propulsion torque requests and brake torque requests;

receiving engine speed data or electric motor speed and wheel speeds data via the transmission gear or shift request module;

generating a transmission gear or shift request; and communicating the transmission gear or shift request to the at least one vehicle system.

15. The non-transitory computer readable medium as in claim 14, wherein the at least one vehicle system is a transmission control unit.

16. The non-transitory computer readable medium as in claim 15, further comprising changing a transmission shift within the vehicle to maintain a target engine speed or electric motor speed and engine or motor torque.

17. The non-transitory computer readable medium as in claim 16, wherein changing the transmission shift facilitates reducing undesirable longitudinal disturbance within the vehicle.

18. The non-transitory computer readable medium as in claim 14, wherein generating the at least one final propulsion torque request and the at least one final brake torque request comprises consolidating propulsion torque requests, brake torque requests, brake torque commands, and feed forward propulsion torque commands.

19. The non-transitory computer readable medium as in claim 14, wherein communicating the at least one final propulsion torque request and at least one final brake torque request to at least one vehicle system comprises: communicating the at least one final propulsion torque request to a propulsion system; and communicating the at least one final brake torque request to a braking system.

20. The non-transitory computer readable medium as in claim 14, further comprising generating a target engine speed or electric motor speed and the target engine or motor torque prior to generating the at least one final propulsion torque request and the at least one final brake torque request.

21. The non-transitory computer readable medium as in claim 20, wherein the at least one vehicle system is a transmission control unit.

22. The non-transitory computer readable medium as in claim 21, further comprising changing a transmission shift within the vehicle to maintain the target engine speed or electric motor speed and engine or motor torque.

23. The non-transitory computer readable medium as in claim 22, wherein changing a transmission shift within the vehicle to maintain a target engine speed or electric motor speed and engine or motor torque occurs during a brake-to-steer event.

* * * * *